United States Patent [19]

Tsuboi

[11] Patent Number: 4,507,667

[45] Date of Patent: Mar. 26, 1985

[54] THERMAL TRANSFER RECORDING APPARATUS

[75] Inventor: Kiyoshi Tsuboi, Yokohama, Japan

[73] Assignee: Tokyo Shibaura Denki Kabushiki Kaisha, Kawasaki, Japan

[21] Appl. No.: 493,274

[22] Filed: May 10, 1983

[30] Foreign Application Priority Data

May 11, 1982 [JP] Japan .................................. 57-77514
May 11, 1982 [JP] Japan .................................. 57-77515

[51] Int. Cl.[3] .............................................. G01D 15/10

[52] U.S. Cl. ................................ 346/76 PH; 400/120; 400/234

[58] Field of Search ................................ 400/234, 120; 346/76 PH; 219/216 PH

[56] References Cited

U.S. PATENT DOCUMENTS 4,173,929 11/1979 Fisher .................................. 400/234
4,313,376 2/1984 Swope et al. ....................... 400/234
4,425,568 6/1984 Moriguchi et al. ............ 346/76 PH
4,463,360 7/1984 Kikucki et al. ................ 346/76 PH
4,468,139 8/1984 Hattori ................................ 400/120

FOREIGN PATENT DOCUMENTS 63493 4/1983 Japan .................................. 400/234

*Primary Examiner*—E. A. Goldberg
*Assistant Examiner*—A. Evans
*Attorney, Agent, or Firm*—Cushman, Darby & Cushman

[57] ABSTRACT

In a thermal transfer printer of the invention, the urging force acting between a thermal head, an ink film and recording paper is released at a point where the thermal head is not operating, that is, before or after one page or at a point of line space or the like. The ink film is fed without printing, so that new portion of the film may be opposed to the head or loosened film may be kept taut. Wrinkles of the ink film are eliminated, and excellent recording is performed without local transfer failure.

8 Claims, 64 Drawing Figures

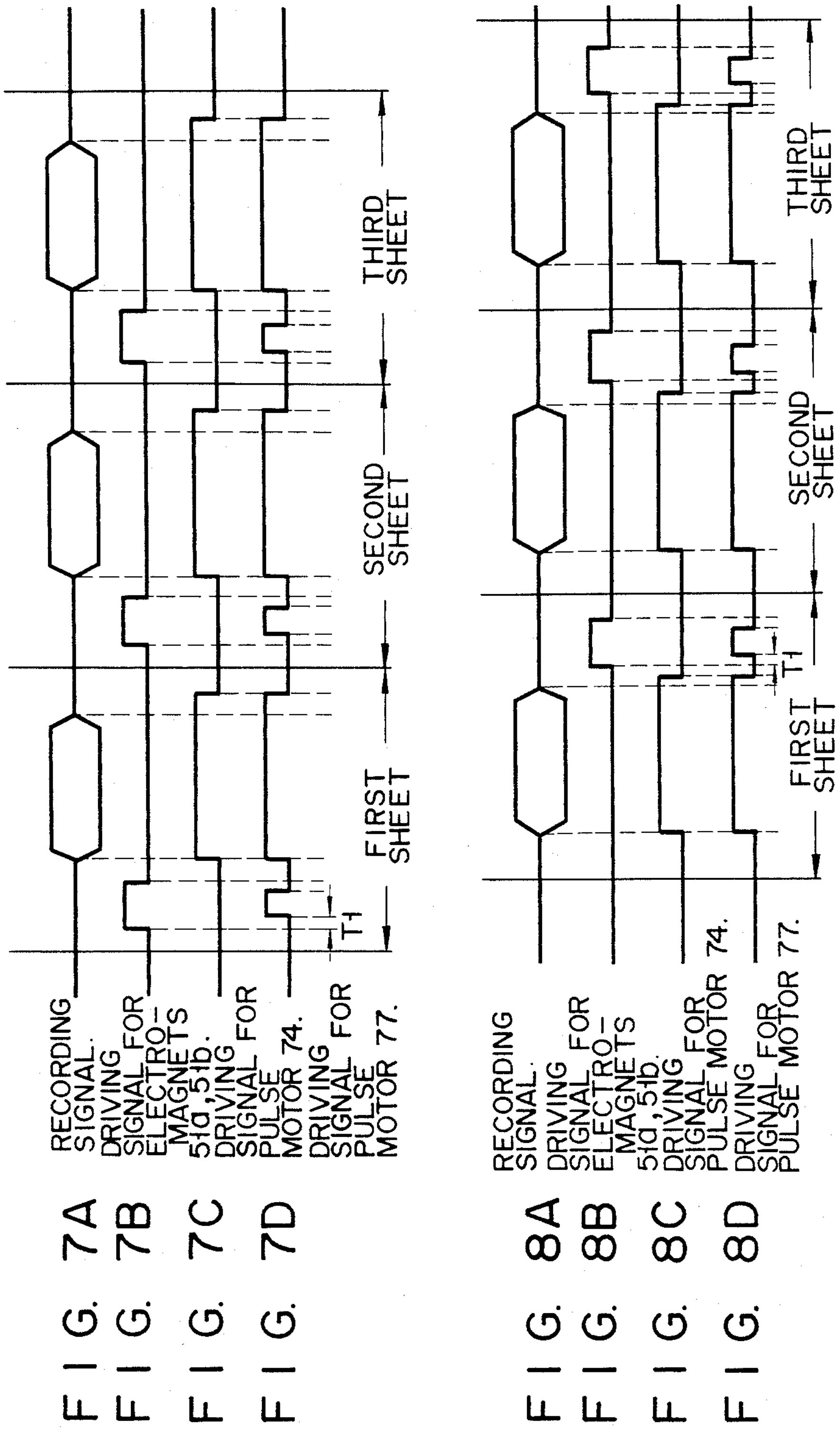
FIG. 7A RECORDING SIGNAL.
FIG. 7B DRIVING SIGNAL FOR ELECTRO-MAGNETS 51a, 51b.
FIG. 7C DRIVING SIGNAL FOR PULSE MOTOR 74.
FIG. 7D DRIVING SIGNAL FOR PULSE MOTOR 77.
FIRST SHEET
SECOND SHEET
THIRD SHEET
T1
FIG. 8A RECORDING SIGNAL.
FIG. 8B DRIVING SIGNAL FOR ELECTRO-MAGNETS 51a, 51b.
FIG. 8C DRIVING SIGNAL FOR PULSE MOTOR 74.
FIG. 8D DRIVING SIGNAL FOR PULSE MOTOR 77.
FIRST SHEET
SECOND SHEET
THIRD SHEET
T1

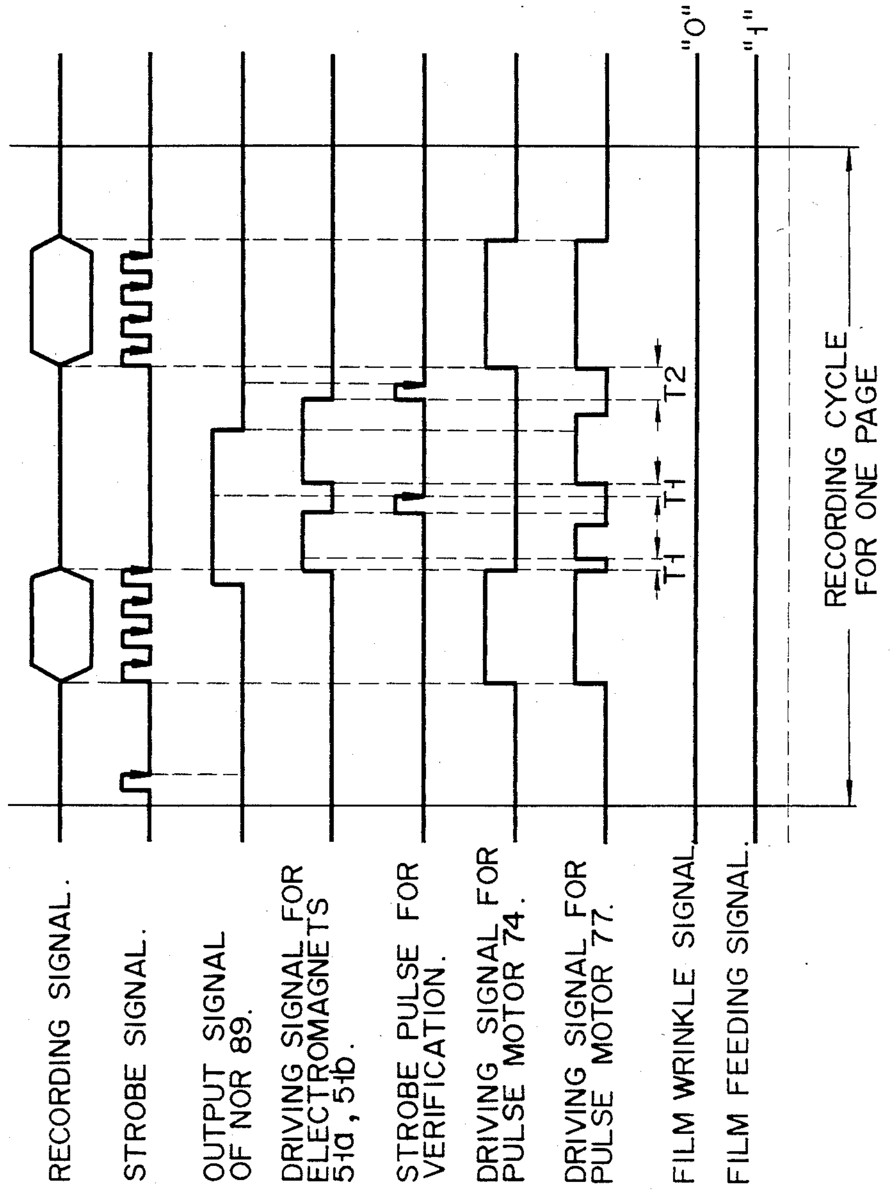
FIG. 17A RECORDING SIGNAL.
FIG. 17B STROBE SIGNAL.
FIG. 17C OUTPUT SIGNAL OF NOR 89.
FIG. 17D DRIVING SIGNAL FOR ELECTROMAGNETS 51a, 51b.
FIG. 17E STROBE PULSE FOR VERIFICATION.
FIG. 17F DRIVING SIGNAL FOR PULSE MOTOR 74.
FIG. 17G DRIVING SIGNAL FOR PULSE MOTOR 77.
FIG. 17H FILM WRINKLE SIGNAL.
FIG. 17I FILM FEEDING SIGNAL.

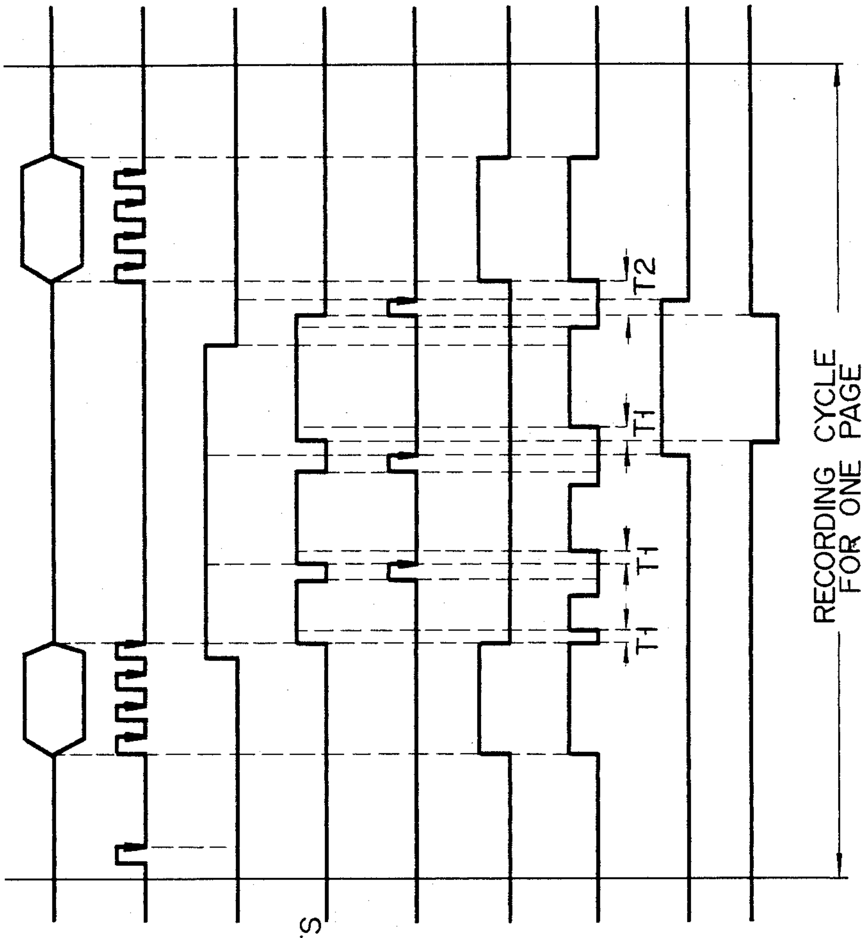
FIG. 18A RECORDING SIGNAL.
FIG. 18B STROBE SIGNAL.
FIG. 18C OUTPUT SIGNAL OF NOR 89.
FIG. 18D DRIVING SIGNAL FOR ELECTROMAGNETS 51a, 51b.
FIG. 18E STROBE PULSE FOR VERIFICATION.
FIG. 18F DRIVING SIGNAL FOR PULSE MOTOR 74.
FIG. 18G DRIVING SIGNAL FOR PULSE MOTOR 77.
FIG. 18H FILM WRINKLE SIGNAL.
FIG. 18I FILM FEEDING SIGNAL.

THERMAL TRANSFER RECORDING APPARATUS

BACKGROUND OF THE INVENTION

The present invention relates to a thermal transfer recording apparatus.

With recent developments in electronic techniques, office automation (OA) is prevalent and a recording apparatus or printer is frequently installed in an office amongst other types of equipment. Of various types of recording apparatus, a thermal transfer apparatus is simple in construction, does not easily allow alteration of recorded information, and allows safe storage of such information. Two types of thermal transfer printers are known. The first type is a serial printer in which a recording head scans transversely together with an ink ribbon for recording along each line. The second type is a line printer in which a thermal head for recording has heating resistors along the entire width for recording. In each type of thermal transfer printer, an ink film as an ink medium is superposed on a recording paper sheet, and a thermal head is urged against the sheet through the ink film, so that the ink is selectively transferred onto the sheet and recording is thus completed.

In a thermal transfer recording apparatus, it is important to ensure tight contact between a thermal head, an ink film and a recording paper sheet, in order to reduce heat resistance and to facilitate ink transfer from the ink film onto the recording paper sheet. In order to ensure tight contact, the ink film is becoming thinner and more flexible.

However, such a thin ink film tends to have an increased number of wrinkles. When there are wrinkles in the ink film, the ink film and the recording paper sheet do not tightly contact each other in places, and desired ink transfer may not be performed thereat. This causes local transfer failure which is one important factor in degrading printing quality. In a serial printer, the width of the ink film is as narrow as several millimeters; it tends not to form wrinkles, and any wrinkles once formed are transferred to the two side portions of the ink film. In a line printer, an ink film of 20 cm width is used wherein an ink is coated to a thickness of several microns on an extremely thin base film of about 10 $\mu m$ thickness. For this reason, wrinkles tend to form due to expansion/shrinkage of the film base by heat or imbalance in tension between a film portion from which the ink has been transferred and a film portion on which the ink is still coated. The wrinkles thus formed are not easily transferred to the sides of the ink film. Once formed, a wrinkle becomes bigger as printing is performed, and finally causes local transfer failure.

In this manner, a printer utilizing thermal transfer of ink has a problem of local transfer failure due to wrinkles formed in the ink film. This problem is also encountered in a serial printer if the ink film is made thinner or wider in order to improve printing speed or resolution.

SUMMARY OF THE INVENTION

It is an object of the present invention to provide a thermal transfer recording apparatus which is simple in construction and which is capable of recording with high reliability.

In order to achieve the above and other objects, there is provided according to the present invention a thermal transfer printer comprising:

(a) an ink carrier including an ink layer capable of exhibiting a predetermined characteristic upon being heated;

(b) a thermal head in which a plurality of heating elements are arranged which are adapted to be urged against a surface of said ink carrier on which said ink layer is not coated;

(c) first feeding means for, in order to transfer said ink layer onto a recording medium by heat from said heating elements of said thermal head, feeding said ink carrier and said recording medium in the same direction by urging said heating elements, said ink carrier and said recording medium against each other;

(d) means for releasing urging force acting among said heating elements, said ink carrier and said recording medium;

(e) second feeding means for feeding said ink carrier independently of said recording medium; and (f) control means, connected to said releasing means and said second feeding means, for controlling said second feeding means so that the urging force acting among said heating elements, said ink carrier and said recording medium is released so as to keep said ink carrier taut, thereby feeding said ink carrier independently of said recording medium.

In a thermal transfer recording apparatus of the present invention, a step is included for detecting a wrinkle formed in an ink film as the ink carrier immediately before it reaches a recording portion, and for releasing the urging force acting between the thermal head and the platen roller upon detection of the wrinkle so as to keep the ink film taut and to eliminate the wrinkle. With the inclusion of this step, local transfer failure due to an increase in the number of wrinkles may be prevented so as to constantly assure high recording reliability. Furthermore, since the ink film and the recording paper sheet may be fed at the same speed as the peripheral speed of the platen roller, tearing, formation of wrinkles and the like of the ink film may be prevented, resulting in further reliability in recording.

BRIEF DESCRIPTION OF THE DRAWINGS

Other objects and features of the present invention will be apparent from the following description taken in connection with the accompanying drawings in which:

FIGS. 7A through 7D are timing charts for explaining the mode of operation of the apparatus shown in FIGS. 1A and 1B, in which FIG. 7A is a timing chart of a driving signal for a thermal head 20, FIG. 7B is a timing chart of a driving signal for electromagnets 51*a* and 51*b*, FIG. 7C is a timing chart of a driving signal for a pulse motor 74 for driving a platen roller 72, and FIG. 7D is a timing chart of a driving signal for a pulse motor 77 for driving an ink film takeup roll 34*b*;

FIGS. 8A through 8D are timing charts of an apparatus according to a modification of the embodiment shown in FIGS. 1A and 1B, in which FIG. 8A is a timing chart of a driving signal for the thermal head 20, FIG. 8B is a timing chart of a driving signal for the electromagnets 51*a* and 51*b*, FIG. 8C is a timing chart of a driving signal for the pulse motor 74 for driving the platen roller 72, and FIG. 8D is a timing chart of a driving signal for a pulse motor 77 for driving the ink film takeup roll 34*b*;

FIGS. 10A through 10D are timing charts of an apparatus according to another modification of the embodiment shown in FIGS. 1A and 1B, in which FIG. 10A is a timing chart of a recording signal (a driving signal for the thermal head), FIG. 10B is a timing chart of a driving signal for the electromagnets 51*a* and 51*b*, FIG. 10C is a timing chart of a driving signal for the pulse motor 74 for driving the platen roller 72, and FIG. 10D is a timing chart of a driving signal for the pulse motor 77 for driving the ink film takeup roll 34*b*;

FIGS. 15A through 15I are timing charts of signals used in the apparatus shown in FIG. 11 when formation of a wrinkle is not detected during one recording cycle for one page, in which FIG. 15A is a timing chart of a recording signal (a driving signal of the thermal head), FIG. 15B is a timing chart of a strobe signal for detecting the presence or absence of a wrinkle, FIG. 15C is a timing chart of a signal obtained by passing output signals from photointerruptors 59*a* and 59*b* through a NOR circuit 89, FIG. 15D is a timing chart of a driving signal for electromagnets 51*a* and 51*b*, FIG. 15E is a timing chart of a strobe pulse for verification, FIG. 15F is a timing chart of a driving signal for a pulse motor 74, FIG. 15G is a timing chart of a driving signal for a pulse motor 77, FIG. 15H is a timing chart of a film wrinkle signal, and FIG. 15I is a timing chart of a film feeding signal;

FIGS. 17A through 17I are timing charts for explaining the mode of operation when a wrinkle is detected during recording, the timing charts of FIGS. 17A to 17I showing the same signals, respectively, as those in FIGS. 15A to 15I;

FIGS. 18A through 18I are timing charts for explaining the mode of operation when wrinkles are not completely eliminated after two wrinkle eliminating operations during the recording operation, the timing charts of FIGS. 18A to 18I showing the same signals, respectively, as those in FIGS. 15A to 15I.

DETAILED DESCRIPTION OF THE PREFERRED EMBODIMENTS

The preferred embodiment of the present invention will now be described with reference to the accompanying drawings.

Figure 1A:
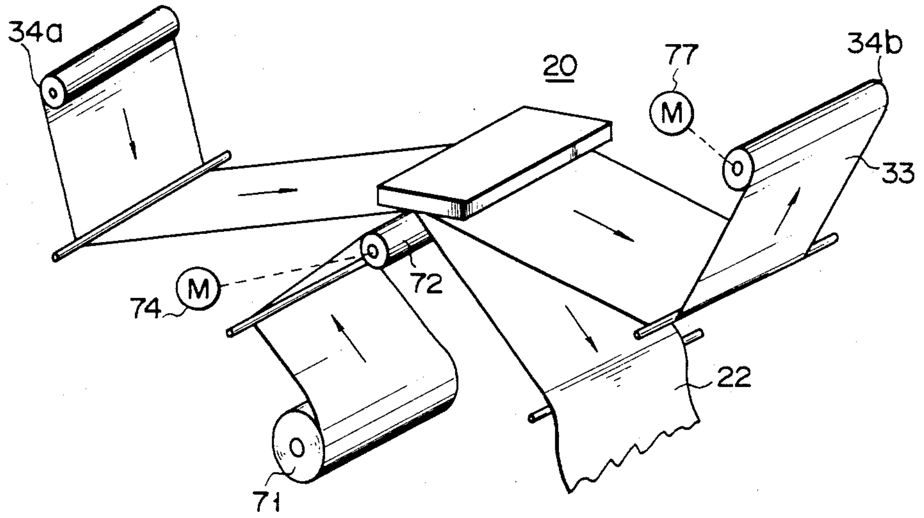
FIGS. 1A and 1B are schematic perspective views showing the basic structure of a thermal transfer recording apparatus according to an embodiment of the present invention.
Figure 1B:
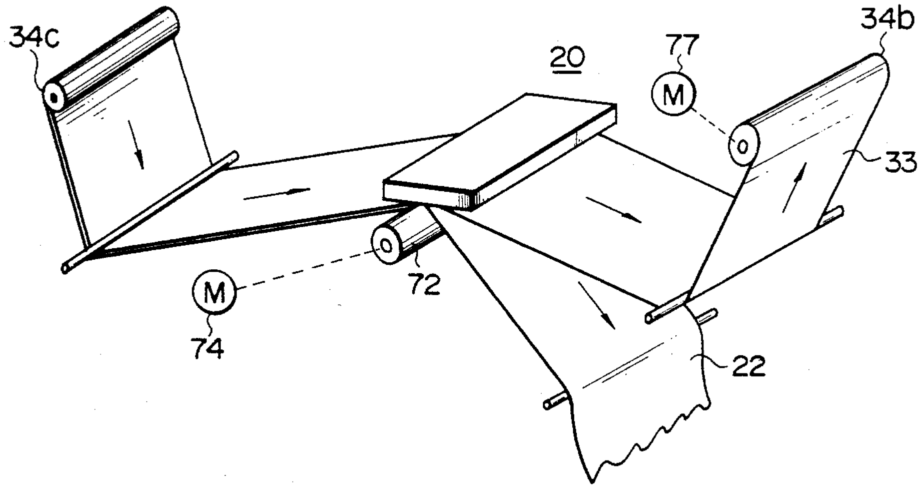

FIG. 1A is a schematic perspective view showing the overall construction of a thermal transfer recording apparatus according to an embodiment of the present invention. An ink film 33 with its base being urged by a thermal head 20 as a recording medium is looped from an ink film supply roll 34*a* to an ink film takeup roll 34*b* and is urged against recording paper 22. The recording paper 22 supplied from a recording paper roll 71 is urged against a platen roller 72 by the urging force of the thermal head 20. Friction acts in an ascending order of strength between the thermal head 20 and the ink film 33, between the ink film 33 and the recording paper 22, and between the recording paper 22 and the platen roller 72. The ink film 33 and the recording paper 22 are supplied at the same speed as the peripheral speed of the platen roller 72 which is driven by a pulse motor 74. After recording is performed as they pass through the gap between the thermal head 20 and the platen roller 72, the recording paper 22 and the ink film 33 are separated from each other. The recording paper 22 is fed outside the apparatus, while the ink film 33 is wound around the ink film takeup roll 34*b* which is driven by a pulse motor 77. A roll 34C of the recording paper 22 together with the ink film 33 may alternatively be used, as shown in FIG. 1B.

Figure 2A:
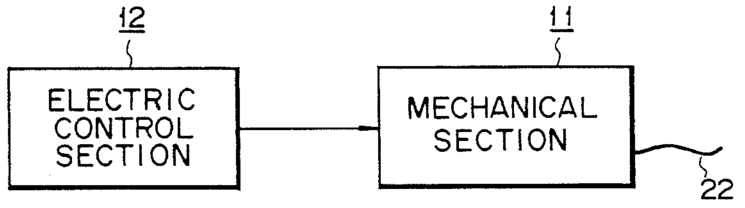
FIG. 2A is a simple block diagram of the overall apparatus shown in FIGS. 1A and 1B.
Figure 2B:
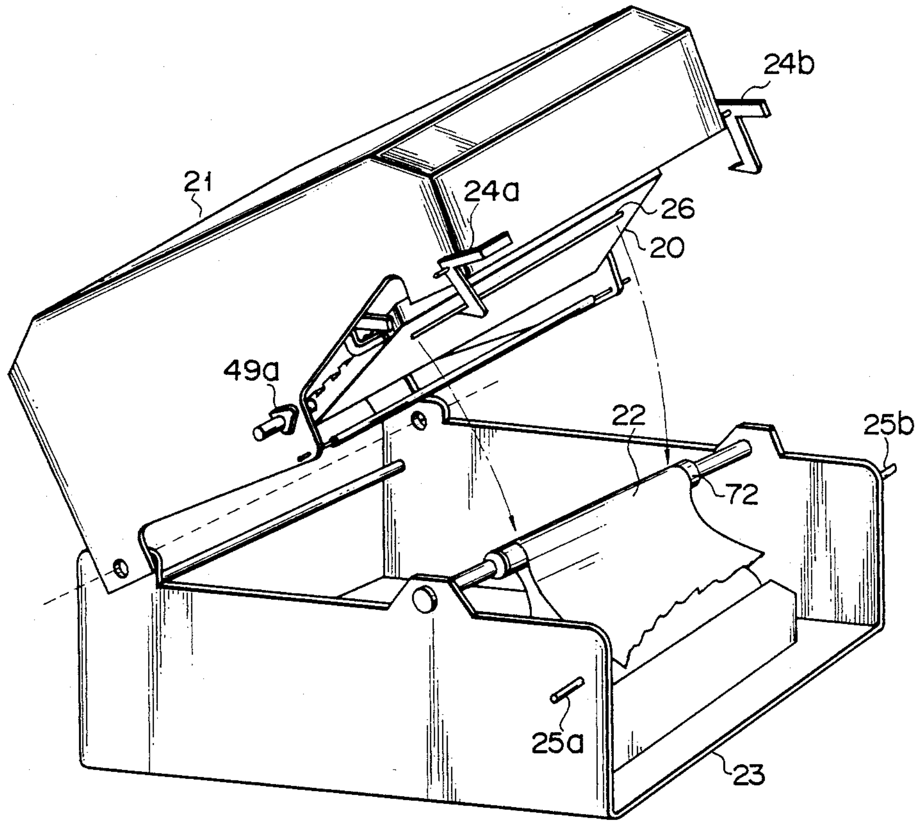
FIG. 2B is a perspective view of the mechanical section of the apparatus shown in FIGS. 1A and 1B.

The thermal transfer recording apparatus having such a basic structure will now be described in more detail with reference to FIGS. 2 through 10. The apparatus of this embodiment basically comprises a mechanical section 11 for actually recording an image, and an electric control section 12 for controlling the mechanical section 11 and for performing data exchange with external devices, as shown in FIGS. 2A. The apparatus receives image data from an external data processing unit or image reader and records an image on the recording paper 22 as a recording medium. As shown in FIG. 2B, the mechanical section 11 of the apparatus comprises an ink film 33 (not shown), an upper cover 21 including the thermal head 20, and a bottom 23 including recording paper 22. The upper cover 21 and the bottom 23 together define a metal box. With the side at which the recording paper 22 is fed out defined as the front side, the upper cover 21 and the bottom 23 are constantly coupled to each other at the rear side through a bearing. Locking hooks 24*a* and 24*b* are arranged on the sides toward the front of the upper cover 21 and can engage with projections 25*a* and 25*b* similarly arranged on the sides toward the front of the bottom 23. Therefore, the upper cover 21 and the bottom 23 may be fixed to each other during recording. During the non-recording period, the upper cover 21 may be opened about the bearing disposed at the rear side of the apparatus. When the upper cover 21 and the bottom 23 are fixed to each other, heating resistors 26 of the thermal head 20 mounted on the upper cover 21 are urged against the recording paper 22. The ink film 33 (not shown) need not be mounted without forming a wrinkle, and is mounted by unlocking the locking hooks 24*a* and 24*b* and opening the upper cover 21.

Figure 3:
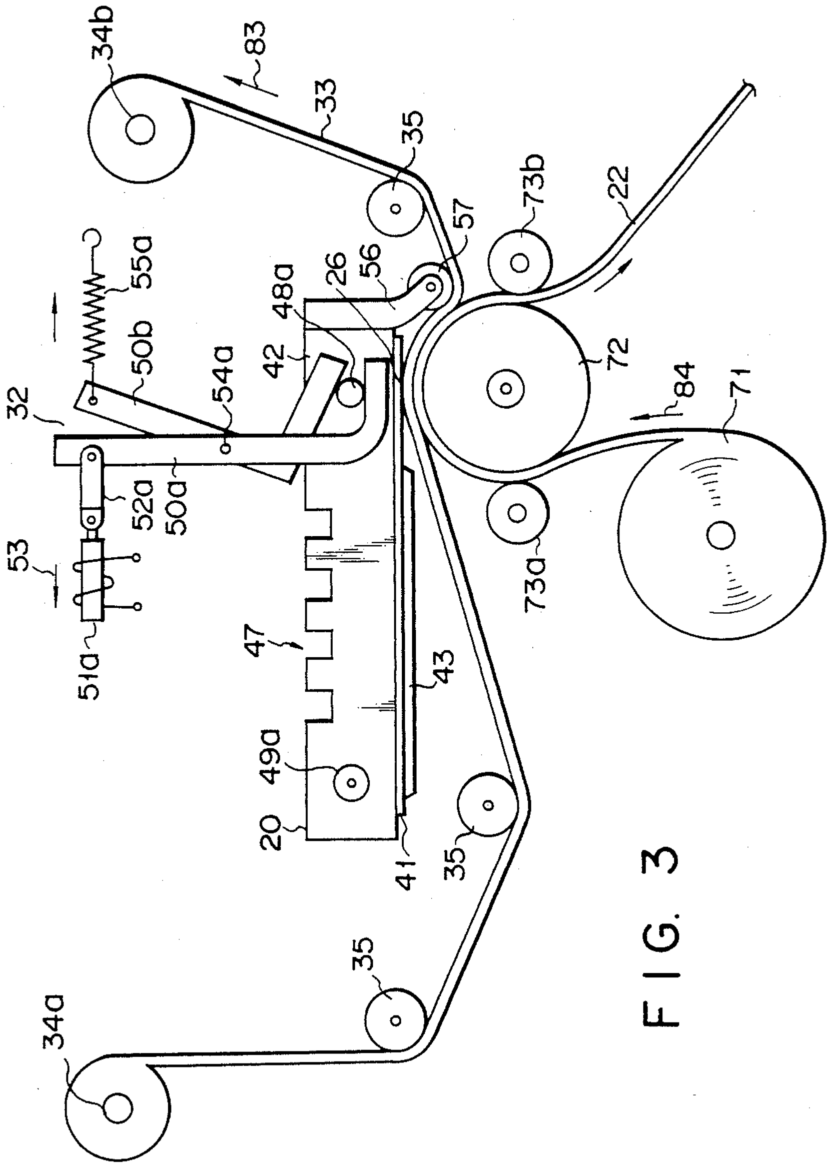
FIG. 3 is a side view of the main part of the apparatus shown in FIGS. 1A and 1B.

The respective parts of the apparatus of the above embodiment will now be described. As shown in FIG. 3, the following parts are mounted on the upper cover 21: the thermal head 20 including the heating resistors 26, a driving system 32 for vertically moving the thermal head 20, the ink film 33, the ink film supply and takeup rolls 34*a* and 34*b*, a guide roller 35, and an ink film driving system (not shown).

Of these parts, the thermal head 20 and the ink film 33 are movable.

Figure 4A:
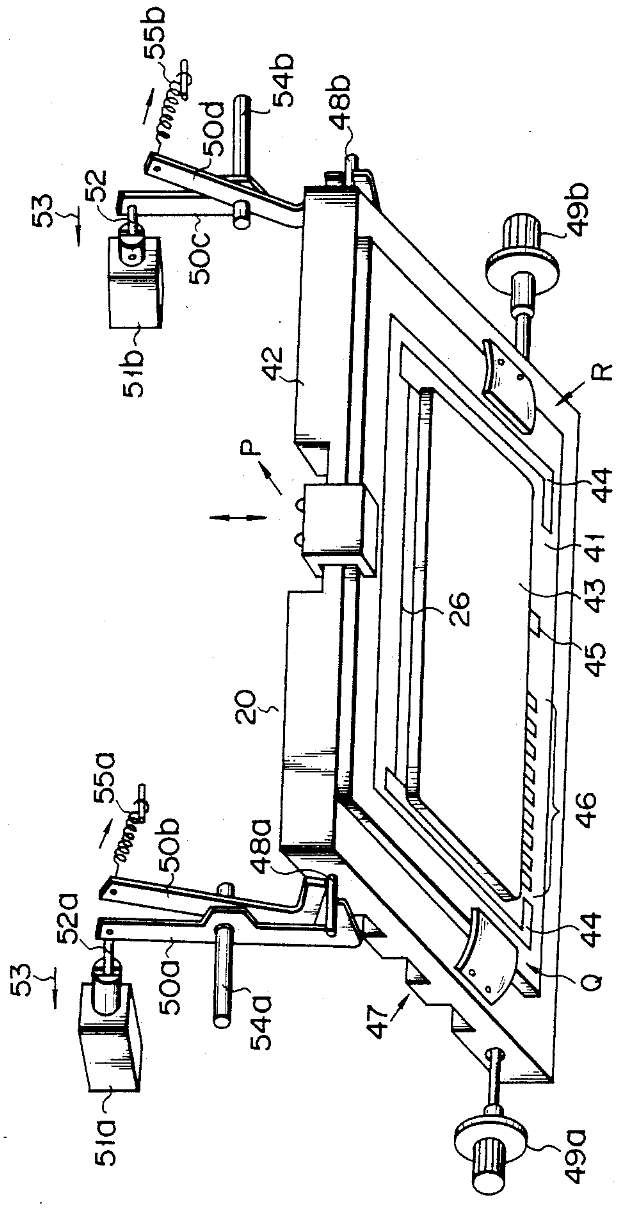
FIG. 4A is a perspective view of a part surrounding a thermal head of the apparatus shown in FIGS. 1A and 1B.

As shown in FIG. 4A, the thermal head 20 comprises a ceramic plate 41 including the heating resistors 26, and a metal plate 42 for holding the ceramic plate 41 at three points P, Q and R by screwing. The position of the heating resistors 26 can be adjusted relative to the recording paper 22 in the direction perpendicular to the feeding direction thereof. Such adjustment is performed by tightening/loosening the screws at points P, Q and R.

The ceramic plate 41 has the heating resistors 26, an IC package 43 of a circuit for driving the heating resistors 26, a terminal 44 for supplying power to the heating resistors 26, a ground terminal 45 and a terminal 40 for supplying various signals to the IC package 43. The IC package 43 receives an image signal, a clock pulse, an enable signal, and a latch signal. The heating resistors 26 are arranged in an array of an overall length of about 215 mm and at a density of 8 to 12 resistors/mm. The apparatus of this embodiment can record on a recording paper sheet having a maximum size of A4. Due to structural reasons, the heating resistors 26 are more dense at one end of the ceramic plate 41; they are more dense at the side where the recording paper 22 is fed out. For the sake of descriptive convenience, the side at which the heating resistors 26 are located is called the front side. The heating resistors 26, the IC package 43 and the like may be those which are commercially available.

The metal plate 41 consists of aluminum and has a three-dimensional structure 47 for facilitating heat dissipation formed at its side opposite to the heating resistors 26 and the like. Projections 48*a* and 48*b* and support metal pieces 49*a* and 49*b* as pivot pins of the metal plate 42 are symmetrically arranged at the front and rear portions, respectively, of the side surfaces of the metal plate 42. As shown in FIG. 2, the support metal pieces 49*a* and 49*b* connect the upper cover 21 and the thermal head 20. Bearings are disposed to surround the axes of the support metal pieces 49*a* and 49*b*, so that the thermal head 20 is pivotal about the axis connecting the support metal pieces 49*a* and 49*b*.

The line connecting the projections 48*a* and 48*b* is immediately above the heating resistors 26. Each of the projections 48*a* and 48*b* is clamped between a pair of levers 50*a* and 50*b* and another pair of levers 50*c* and 50*d*, respectively. Each of the levers 50*a* to 50*d* has a substantially L-shape. The paired levers 50*a* and 50*b* and the paired levers 50*c* and 50*d* are fixed by pins 54*a* and 54*b*, respectively, so as to resemble scissors, thereby clamping the projections 48*a* and 48*b* therebetween.

At the ends of the levers 50*a* and 50*c* which do not contact with the projections 48*a* and 48*b*, the levers 50*a* and 50*c* are dynamically connected to the electromagnets 51*a* and 51*b* through plates 52*a* and 52*b*, as shown in FIG. 3. When energized, the electromagnets 51*a* and 51*b* apply on the plates 52*a* and 52*b* a force acting from the front to the rear as indicated by arrow 53. Due to the provision of the pins 54*a* and 54*b* and the L-shapes of the levers 50*a* and 50*c*, an upward force acts on the projections 48*a* and 48*b*. This force is given by 3 kg·f(29N) for each of electromagnets 51*a* and 51*b*.

A spring 55*a* is connected to one end of the lever 50*b*, while a spring 55*b* is connected to one end of the lever 50*d*. The other end of each of the springs 55*a* and 55b is fixed to the upper cover 21. The springs 55*a* and 55*b* normally apply a force to the levers 50*b* and 50*d*, respectively, which force acts opposite to that of the electromagnets 51*a* and 51*b*, that is, a force acting from the rear to the front of the thermal head 20. This force then results in a downward force acting on the projections 48*a* and 48*b* by means of the pins 54*a* and 54*b*. This force is given by 2 kg·f(19.6N).

Since the projections 48*a* and 48*b* are formed integrally with the metal plate 42, the force described above pivots the thermal head 20. Thus, the downward force constantly acts on the thermal head 20. When the electromagnets are energized, an upward force acts on the thermal head 20 during non-recording periods, as will be described later. In a thermal transfer recording apparatus or printer of this embodiment, the heating resistors 26, the ink film 33 and the recording paper 22 are superposed upon each other for recording. In particular, when a pressure is applied from the side of the heating resistors 26 and the ink film 33 is urged against the recording paper 22, the line of force acting on the thermal head 20 coincides with the line connecting the heating resistors 26, the printing portion on the recording paper 22, and the center of the platen roller 72 to be described later. Thus, the line of force coincides with the direction along which a maximum heat energy is transmitted from the heating resistors 26 to the ink film 33 and the recording paper 22. Thus, ink transfer may be performed stably and reliably. In addition, the thermal head 20 may be pivoted efficiently with a minimum force due to the sufficiently long intersection with the points of acting force. In a non-recording period, power is supplied to the electromagnets 51*a* and 51*b* as needed so that an upward force acts on the thermal head 20 and an urging force acting between the ink film 33 and the recording paper 22 is released. Therefore, the ink film 33 and the recording paper 22 are free to run.

A pinch roller 57 (omitted in FIGS. 2 and 4A) is mounted on the front surface of the metal plate 42 through an arm 56, as shown in FIG. 3. As will be described later, the pinch roller 57 does not immediately separate the recording paper 22 and the ink film 33 but allows them to run together for a short period of time, so that the ink may be uniformly transferred.

Figure 4B:
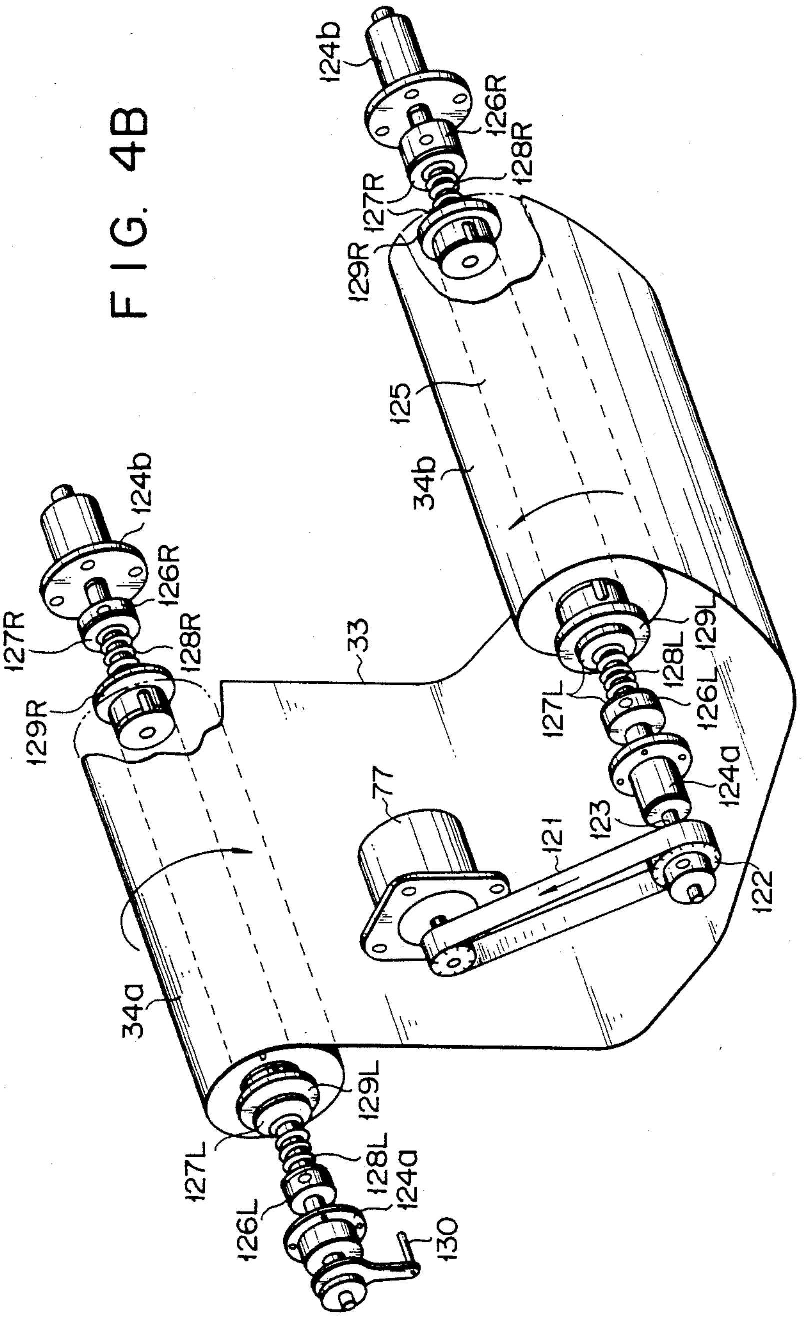
FIG. 4B is a perspective view of a feeding system of an ink film of the apparatus shown in FIGS. 1A and 1B.

The film driving system will now be described. Note that the ink film 33 as an ink carrier is very wide and thin and tends to easily forms wrinkles. According to the present invention, once a wrinkle is formed, it is eliminated to prevent local transfer failure. The driving force of the driving system is the rotational force of the pulse motor 77 as shown in FIG. 4B. The rotational force of the pulse motor 77 is transmitted to a sprocket 122 for driving the ink film takeup roll 34*b* through a toothed belt 121. The sprocket 122 has a columnar shape; it has grooves on its circumferential surface for engagement with the toothed belt 121. A shaft 123 extends along the central axis of the sprocket 122 to be integral therewith. The shaft 123 is fixed to the upper cover 21 through bearings 124*a* and 124*b*. The ink film 33 is wound between the bearings 124*a* and 124*b*. The ink film takeup roll 34*b* takes up used ink film 33 and therefore becomes larger in diameter. If the rotational frequency of the pulse motor 77 is kept constant, the feeding speed of the ink film 33 may not be kept constant. In order to prevent this, an ink film takeup shaft 125 has an angular speed difference from that of the rotation of the shaft 123. For this purpose, pressure adjusting pieces 126L and 126R are fitted around the shaft 123. The sides of the pressure adjusting pieces 126L and 126R which are opposite to the ink film takeup shaft 125 are fixed to the wall of the upper cover 21, and the pressure adjusting pieces 126L and 126R cannot move in this direction.

Shaft press discs 129L and 129R are arranged through friction plates 127L and 127R and springs 128L and 128R, respectively, at the sides of the pressure adjusting pieces 126L and 126R, so that the ink film takeup shaft 125 is clamped therebetween. The rotational force of the shaft 123 is transmitted to the pressure adjusting piece 126L and then to the shaft press disc 129L through the spring 128L. Due to the presence of the spring 128L, friction is due to the rotational force of the shaft 123. Thus, the rotational force corresponding to the amount (weight) of the ink film 33 is not transmitted to the shaft press disc 129L. For this reason, as the amount of the ink film 33 wound increases, the rotational frequency of the ink film takeup shaft 125 decreases. However, the radius of the film roll increases, so that the feed speed of the ink film 33 is kept constant.

Similarly, the springs 129L and 129R press the ink film takeup shaft 125 in the opposite directions, so that the rotational force of the shaft press discs 129L and 129R is transmitted to the ink film roll.

The ink film supply roll 34*a* supplies the ink film 33 and has a similar structure to that of the ink film takeup roll 34*b*. However, a rotation stop 130 replaces the sprocket 122.

With this structure, the ink film 33 is fed at a constant speed and a constant tension is applied thereon, so that a wrinkle may not be formed therein.

The bottom 23 will now be described. As shown in FIG. 3, the bottom 23 has recording paper roll 71, the platen roller 72 for feeding the recording paper 22 fed from the recording paper roll 71 and feeding it outside the apparatus after ink transfer, and pinch rollers 73*a* and 73*b* which are in tight contact with the recording paper 22 and the platen roller 72 so as to reliably transmit the feeding force of the platen roller 72 to the recording paper 22.

Figure 5:
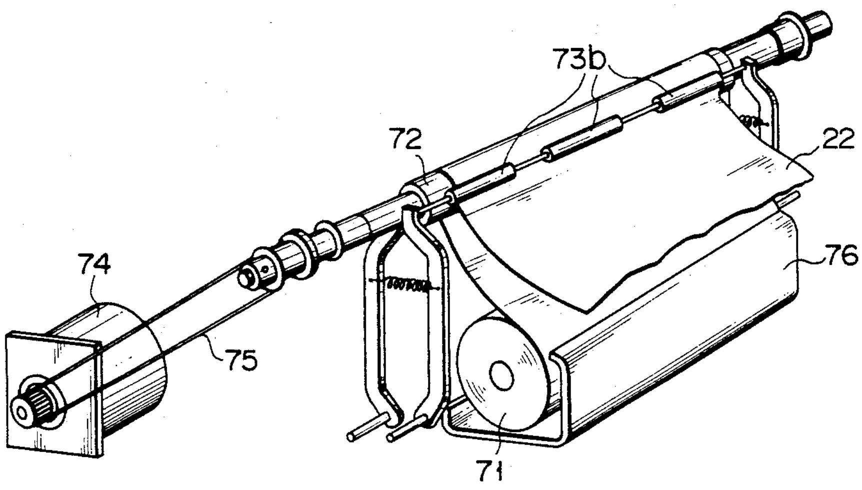
FIG. 5 is a perspective view showing a feeding system of recording paper of the apparatus shown in FIGS. 1A and 1B.

As shown in FIG. 5, the recording paper roll 71 is housed in a container 70. Rotational force of the pulse motor 74 is transmitted to the platen roller 72 through a toothed belt 75.

Figure 6:
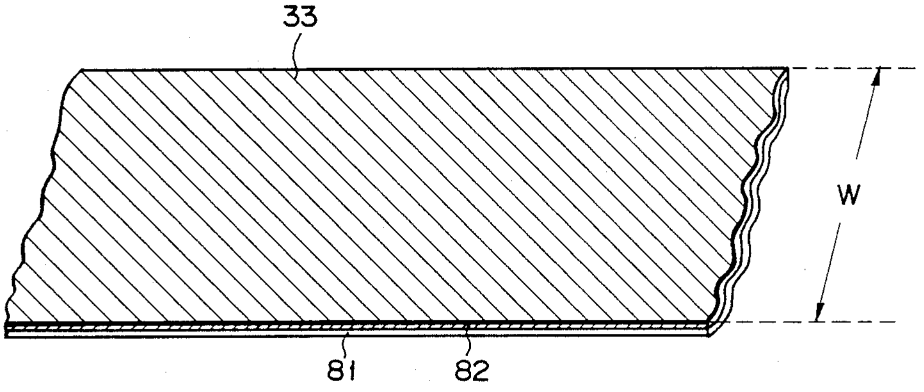
FIG. 6 is a perspective view of the ink film used in the apparatus shown in FIGS. 1A and 1B.

The ink film 33 will now be described. As shown in FIG. 6, the ink film 33 comprises a capacitor paper or polyester film 81 having a thickness of 6 through 12 μm and a width W of 220 mm, and a black ink layer 82 coated thereover in an amount of 4 $g/m^2$ and in a width W of 220 mm to a uniform thickness.

The ink of the ink layer 82 is melted, rendered viscous or sublimes after being heated and may therefore be transferred to the recording paper 22. As described earlier, the ink film 33 is very thin and easily forms a wrinkle.

Mounting of the ink film 33 will now be described. Before using the apparatus, the locking state between the upper cover 21 and the bottom 23 is released and the upper cover 21 is opened. Then, the ink film supply and takeup rolls 34*a* and 34*b* and the rollers 35 and 57 as the ink film driving system is exposed to the outside. The ink film 33 is supplied from the ink film takeup roll 34*a*, looped around the rollers 35 and 57, and reaches the ink film takeup roll 34*b*. A tape piece is adhered on the leading end of the ink film 33. The tape piece may be separated from the ink film 33 and may be adhered onto the ink film takeup shaft 125. Then, the ink film 33 may be easily mounted and a wrinkle may not be formed.

The mechanical section 11 as described above operates as seen from the timing charts shown in FIGS. 7A through 7D. FIG. 7A shows a recording signal (driving signal for the thermal head 20), FIG. 7B shows a driving signal for the electromagnets 51*a* and 51*b* as an urging force release signal, FIG. 7C shows a driving signal for the pulse motor 74 for driving the platen roller 72, and FIG. 7D shows a driving signal for the pulse motor 77 for driving the ink film takeup roll 34*b*.

In the recording ready state wherein the recording paper 22 and the ink film 33 are mounted, a current is not supplied to the electromagnets 51*a* and 51*b*, and the thermal head 20 and the platen roller 72 are urged against each other. For recording on a first recording paper sheet, the electromagnets 51*a* and 51*b* are simultaneously energized for a predetermined time period first, and then the urging force acting between the thermal head 20 and the platen roller 72 is released. When the urging state is released, the tight contact between the recording paper 22 and the ink film 33 is released, and the recording paper 22 and the ink film 33 may be independently moved relative to each other. After the electromagnets 51*a* and 51*b* are energized, it generally takes a certain time period of about 50 msec before the urging force is released against the biasing force of the springs 55*a* and 55*b* and the weight of the thermal head 20. Therefore, after a time period T1 longer than such certain time period, a driving pulse as shown in FIG. 7D is supplied to the pulse motor 77 and the ink film 33 is fed for a predetermined distance. Then, the ink film 33 is kept taut, and a wrinkle, if any, is eliminated. After such a wrinkle is eliminated from the ink film 33, the electromagnets 51*a* and 51*b* are deenergized, so that the thermal head 20 and the platen roller 72 are urged against each other. Then, the heating resistors 26 are energized in accordance with the recording signal shown in FIG. 7A while a driving pulse as shown in FIG. 7C is supplied to the pulse motor 74. The platen roller 72 is then rotated, so that the recording paper 22 and the ink film 33 are urged against each other and are fed at the same speed and in the same direction. At the same time, a driving signal as shown in FIG. 7D is supplied to the pulse motor 77, and the ink film 33 from which the ink has been transferred is taken up by the roll 34*b*. The recording timing as shown in FIG. 7A is after the urging state between the thermal head 20 and the platen roller 72 is stabilized after the certain time period from the energizing timing of the electromagnets 51*a* and 51*b*. With this arrangement, the air between the two members may be expelled and the tight contact between the two members is assured.

The electric control section 12 for generating the electric signals as described above will now be described with reference to FIG. 9.

Figure 9:
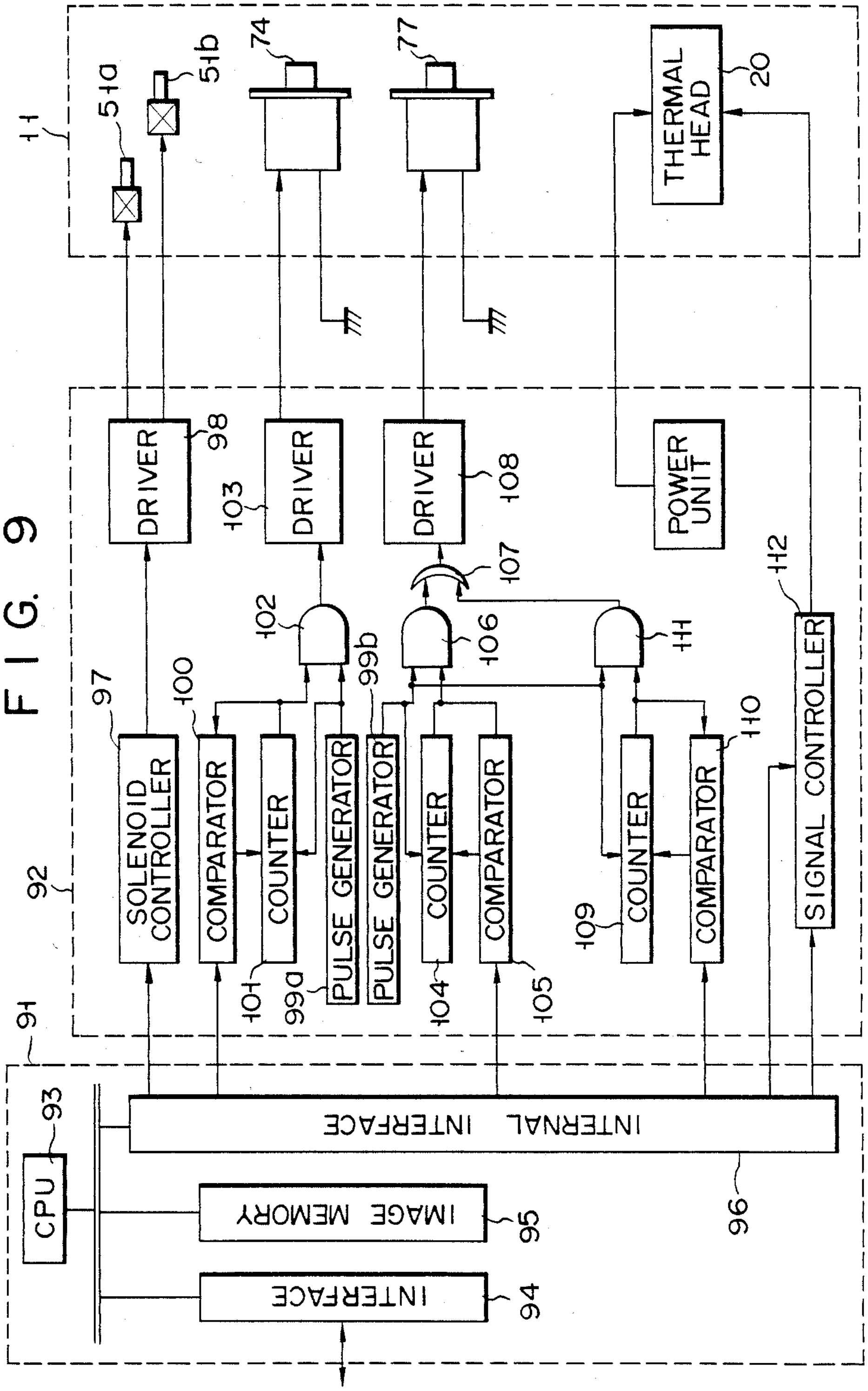
FIG. 9 is a block diagram of an electric control section in the first embodiment, the modification thereof, and another modification thereof.

The electric control section 12, as shown in FIG. 9, comprises an input/output control section 91 for controlling input/output of data with external devices, and a mechanical control section 92 for supplying control signals to the mechanical section 11 in accordance with commands and image data from the control section 91.

The input/output control section 91 mainly has a CPU 93. The CPU 93 receives the image data from an external data processing unit (not shown) through an interface 94. The CPU 93 stores the image data in an image memory 95. The image data supplied from the data processing unit is image signals of one page or one line and comprises binary signals of "0" and "1". The CPU 93 may be an 8-bit microprocessor Z80 available from Zilog Inc.

The binary image signals are stored two-dimensionally in the image memory 95. In general image scanning, an image is scanned in the main scanning direction first and is then scanned in the subscanning direction corresponding to the paper feeding direction. The obtained signals are stored in the image memory 95 for each line and in the order they are read. For example, flags are included at the start or end of each scanning line.

After the image data is thus stored, it is supplied together with the control signals to the mechanical control section 92 through an internal interface 96, so that recording may be started.

The mechanical control section 92 comprises a circuit for controlling the electromagnets 51*a* and 51*b* for vertically moving the thermal head 20, a circuit for controlling the pulse motors 74 and 77 for feeding the recording paper 22 and the ink film 33, and a circuit for feeding signals corresponding to the image data to the thermal head 20.

The circuit for controlling the electomagnets 51*a* and 51*b* comprises a solenoid controller 97 and a driver 98. The CPU 93 supplies a pulse signal to the solenoid controller 97 only when the thermal head 20 is vertically moved. The solenoid controller 97 comprises a flip-flop and supplies a pulse having a pulse width corresponding to the pulse separation between the two pulse signals from the CPU 93 to the driver 98. The driver 98 then converts the input pulse to a voltage as shown in FIG. 7B for driving the electromagnets 51*a* and 51*b*, which is supplied to the electromagnets 51*a* and 51*b*.

The circuit for controlling the pulse motor 74 for feeding the recording paper 22 comprises a pulse generator 99*a*, a comparator 100, a counter 101, an AND circuit 102, and a driver 103. The CPU 93 performs the following control in order to feed the recording paper 22 for a distance corresponding to the size of the area for recording. The CPU 93 first sets a value in the comparator 100. Then, the comparator 100 commands the counter 101 to start counting. Pulse signals from the pulse generator 99*a* are supplied to and counted by the counter 101.

While the counter 101 counts pulse signals, it produces a signal of logic level "1". This signal is supplied to the AND circuit 102 and is ANDed thereby with the pulse signal from the pulse generator 99*a*. An output signal from the AND circuit 102 is a pulse signal synchronous with the pulse signal from the pulse generator 99*a* as long as the counter 101 performs counting.

The count of the counter 101 is supplied to the comparator 100. When the count from the counter 10 coincides with the value set by the CPU 93, the comparator 101 stops the counter 101. Then, an output signal from the counter 101 falls to logic level "0", and an output signal from the AND circuit 102 also falls to logic level "0". This pulse signal is as shown in FIG. 7C.

The output signal from the AND circuit 102 is supplied to the driver 103. The driver 103 converts the input signal to a voltage sufficient for driving the pulse motor 74. The voltage is applied to the pulse motor 74.

The circuit for controlling the pulse motor 74 for feeding the ink film 33 has a similar configuration. The circuit comprises a pulse generator 99*b*, a counter 104, a comparator 105, an AND circuit 106, an OR circuit 107 and a driver 108.

An output signal from the AND circuit 106 is similar to that from the AND circuit 102 and is a pulse signal of a pulse width corresponding to the size of the area to be recorded. A circuit consisting of an AND circuit 111, a comparator 110 and a counter 109 is for feeding the ink film 33 for a predetermined distance and for eliminating a wrinkle of the ink film 33 if any. The pulse signal from the AND circuit 106 and the output signal from the AND circuit 111 are ORed by the OR circuit 107.

An output signal from the OR circuit 107 is supplied to the driver 108 and then to the pulse motor 77. The signal supplied to the pulse motor 77 is a pulse signal as shown in FIG. 7D. The image signal as shown in FIG. 7A is supplied to the heating resistors 26 of the thermal head 20 through a signal controller 112 and recording is performed.

In this manner, if the urging force between the thermal head 20 and the platen roller 72 is released and the ink film 33 is independently fed before recording one page, a proper tension is applied on the ink film 33 and a'wrinkle, in any, is eliminated. Therefore, any portion of the ink film 33 which may easily form a wrinkle may be fed out so that stable recording without local transfer failure may be performed.

A modification of the embodiment as described above will now be described with reference to FIGS. 8A through 8D. FIG. 8A shows a recording signal, FIG. 8B shows a driving signal for the electromagnets 51*a* and 51*b*, FIG. 8C shows a driving signal for the pulse motor 74, and FIG. 8D is a driving signal for the pulse motor 77. In this modification, the timing for driving the electromagnets 51*a* and 51*b* and the timing for feeding the ink film 33 alone are after recording one page unlike the case of the embodiment described above.

This modification will now be described with reference to FIGS. 2 through 6, 8 and 9. The mechanical section 11 is similar to that of the first embodiment, and timings will only be described. In the recording ready state wherein the recording paper 22 and the ink film 33 are mounted, the electromagnets 51*a* and 51*b* are not energized and the thermal head 20 and the platen roller 72 are urged against each other. For recording, the heat resistors 26 are energized in accordance with the recording signal as shown in FIG. 8A, while at the same time a driving signal as shown in FIG. 8C is supplied to the pulse motor 74 to drive the platen roller 72. Thus, the recording paper 22 and the ink film 33 are urged against each other and are fed at the same speed and in the same direction for recording. At the same time, as shown in FIG. 8D, the ink film 33 is taken up. After recording one page, the platen roller 72 is fed until the portion of the recording paper 22 on which the image is recorded is fed outside the apparatus. Then, the pulse motors 74 and 77 are temporarily stopped. Subsequently, the electromagnets 51*a* and 51*b* are energized, and the urging force acting between the thermal head 20 and the platen roller 72 are released. After the time period T1 has elapsed from the energization of the electromagnets 51*a* and 51*b*, the pulse motor 77 is driven to feed the ink film 33 alone for a predetermined distance. Thereafter, this operation is repeated for recording.

In this modification, the feeding of the first sheet of recording paper is faster than in the case of the embodiment described above.

Figures 10A, 10B, 10C, 10D:
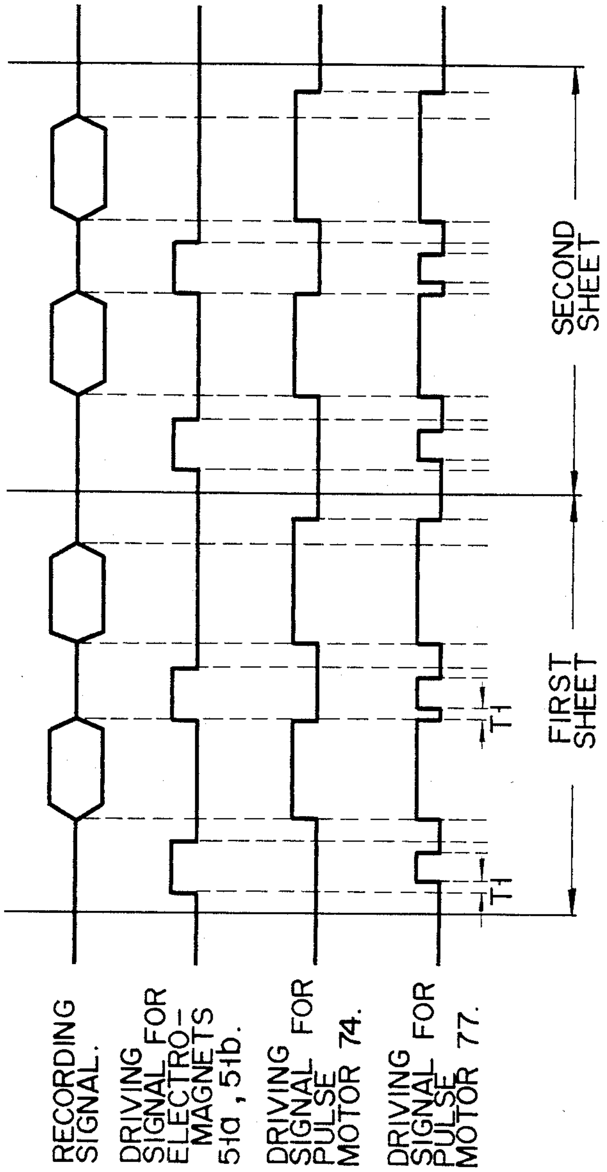

Still another modification of the embodiment will now be described with reference to FIGS. 10A to 10D. FIG. 10A shows a recording signal, FIG. 10B shows a driving signal for the electromagnets 51*a* and 51*b*, FIG. 10C shows a driving signal for the pulse motor 74, and FIG. 10D is a driving signal for the pulse motor 77.

This modification is different from the embodiment described above with respect to the driving timing of the electromagnets 51*a* and 51*b*, and the timing for feeding the ink film 33 alone. In this modification, the ink film is fed during recording for one page. This modification will now be described with reference to FIGS. 2 through 6, 9 and 10. The mechanical section 11 is similar to that of the above embodiment, and only timings will be described below. In the recording ready state, the electromagnets 51*a* and 51*b* are not energized, and the thermal head 20 and the platen roller 72 are urged against each other. When recording for one page is initiated from this state, the electromagnets 51*a* and 51*b* are first energized to release the urging force acting between the thermal head 20 and the platen roller 72. After a certain time period T1 has elapsed from the energization of the electromagnets 51*a* and 51*b*, the ink film 33 is fed for a predetermined distance to perform the first wrinkle eliminating operation. Subsequently, the electromagnets 51*a* and 51*b* are deenergized. Thus, the thermal head 20 is urged against the platen roller 72, and the heating resistors 26 are energized in accordance with the recording signal. At the same time, a driving pulse is supplied to the pulse motors 74 and 77 so that the recording paper 22 and the ink film 33 are urged against each other and are fed at the same speed and in the same direction for recording. Before wrinkles are formed and local transfer failure is caused after recording for some time, the recording signal is interrupted as shown in FIG. 10A. At the same time, the supply of the driving signals to the pulse motors 74 and 77 is also interrupted (FIGS. 10C and 10D) so that the rotation of the platen roller 72 and the ink film takeup roll 34*b* is stopped. After the CPU 93 counts a predetermined number of recorded lines, it counts the number of white lines. This may be performed, for example, by ANDing all the bits of one line; a white line is determined if the obtained AND result is a signal of logic level "0". When the count of white lines has reached a predetermined number, this number is set in the comparators 100 and 105 so as to stop the pulse motors 74 and 77. In a general facsimile system, 12 is the predetermined number of white lines corresponding to 1.5 mm if the white space between two lines is 2 mm or more. Due to the characteristics of the pulse motor, if a driving pulse is not supplied, it is locked at the stopped position. Therefore, the recording paper may be stopped with a precision of 100 μm or less. Thus, deviation of the recorded image after restart of the apparatus may not be caused. Subsequently, as shown in FIG. 10B, the electromagnets 51*a* and 51*b* are energized to release the urging force acting between the thermal head 20 and the platen roller 72, and the ink film is fed for a predetermined distance as shown in FIG. 10D so as to perform the second wrinkle eliminating operation. Even if any wrinkles have been formed in the ink film 33, they may thus be eliminated. The thermal head 20 is urged against the platen roller 72 for continuing the recording operation, and recording of one page is completed. It is to be noted that the number of operations for eliminating the wrinkles of the ink film during recording of one page is not particularly limited to any specific number.

According to this modification, even if the recording time of one page is long, stable recording quality may be guaranteed by including a step of eliminating wrinkles of the ink film so as to prevent local transfer failure.

Another embodiment of the present invention will now be described with reference to FIGS. 2A, 4 through 6, 11 and 16. Since the basic configuration remains the same as that of the first embodiment, the same reference numerals as in the first embodiment denote the same parts and a detailed description will be omitted. In particular, FIGS. 2A and 4 through 6 are the same as those of the first embodiment.

Figure 11:
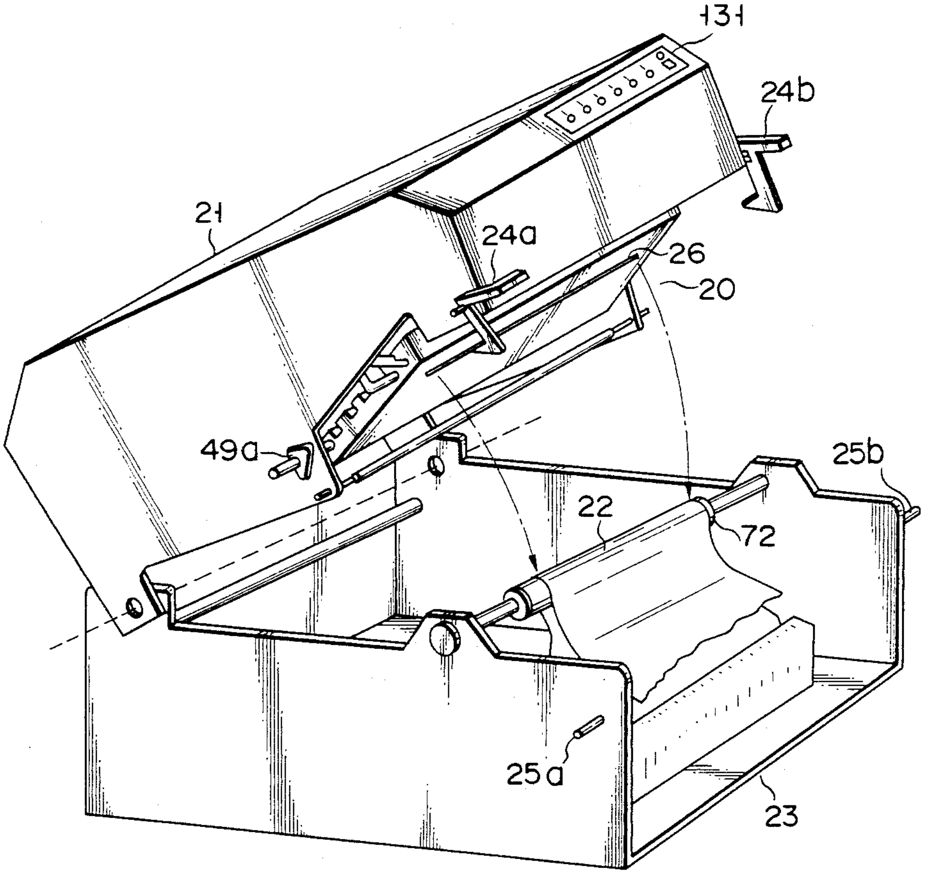
FIG. 11 is a perspective view showing the overall outer appearance of a thermal transfer recording apparatus according to another embodiment of the present invention.
Figure 12:
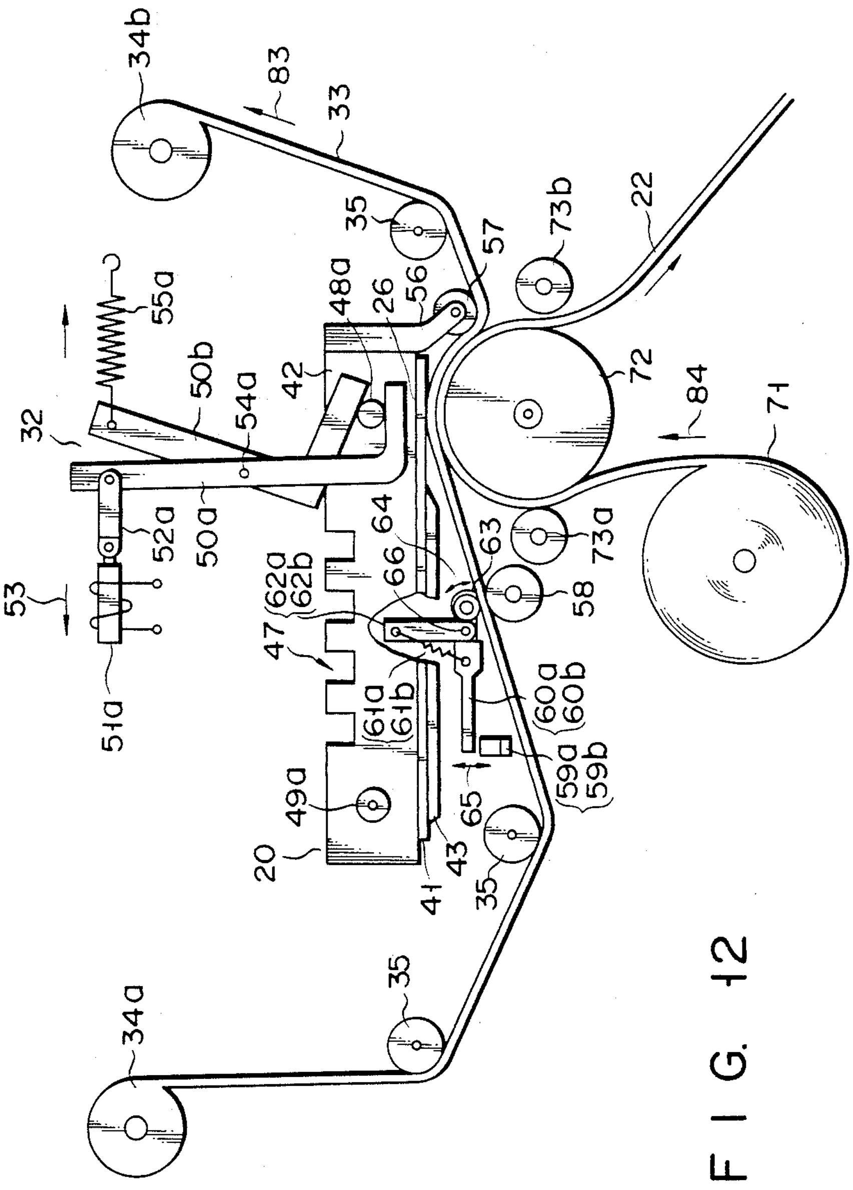
FIG. 12 is a side view of the main part of the apparatus shown in FIG. 11.
Figure 13A:
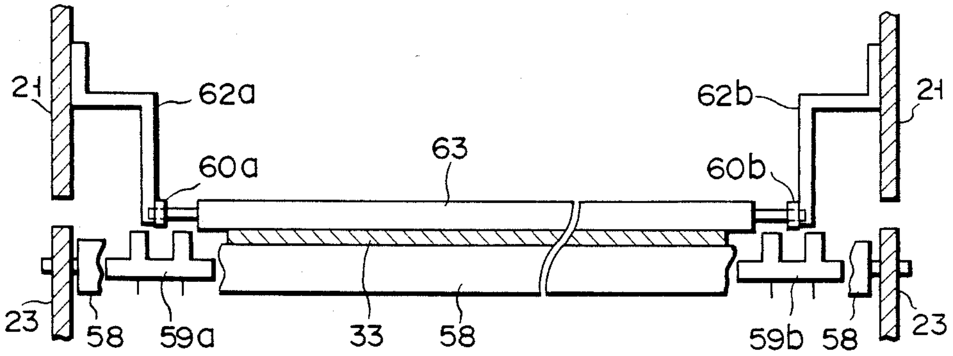
FIGS. 13A and 13B show respectively a front view of a wrinkle detection mechanism of the apparatus shown in FIG. 11.
Figure 13B:
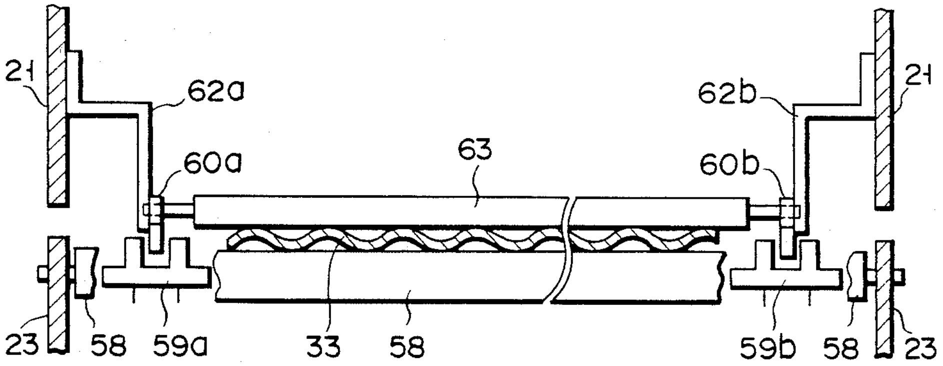

A description will, therefore, be made for the parts of this embodiment which are different from the first embodiment. FIG. 11 is a perspective view of a mechanical section 11 of this embodiment. Referring to FIG. 11, a control panel 131 is arranged at the upper front portion of an upper cover 21, which is not included in the section shown in FIG. 2B. FIG. 12 is a side view of the main part of this embodiment. This embodiment is different from the first embodiment in that the second embodiment includes a wrinkle detection mechanism. FIGS. 13A and 13B are front views of the wrinkle detection mechanism. The wrinkle detection mechanism has a detector which is located in the vicinity of the contact portion between the thermal head 20 and the platen roller 72 and which is located at the supply side of the ink film 33. A roller 58 is supported at the side surfaces of a bottom 23 and rotates as an ink film 33 is fed. A detection roller 63 opposes the roller 58. The detection roller 63 is clamped between the distal ends of a pair of detection levers 60*a* and 60*b* and is rotatable. The detection levers 60*a* and 60*b* are supported by support metal pieces 62*a* and 62*b* fixed to the side surfaces of the upper cover 21, so that the detection roller 63 may be vertically pivotal about a fulcrum 66 as indicated by arrow 64. The roller 63 is urged against the roller 58 by springs 61*a* and 61*b* with a force which is not so strong as to press the ink film 33 fed between the roller 58 and itself. The detection levers 60*a* and 60*b* extend oppositely to the detection roller 63 from the fulcrum 66 for a distance longer than the distance between the fulcrum 66 and the center of the detection roller 63. Thus, a slightest vertical movement of the detection roller 63 as indicated by arrow 64 is amplified as indicated by arrow 65 at the rear ends of the detection levers 60*a* and 60*b*.

In order to detect the movements of the detection levers 60*a* and 60*b*, photointerruptors 59*a* and 59*b* are arranged as shown in the drawings. The photointerruptor detects the position of the detection lever when it is interposed between an LED and a photodiode. FIG. 13A shows a case wherein the ink film 33 has no wrinkle, the rear ends of the detection levers 60*a* and 60*b* do not shield light, and an output from the LED is at logic level "1" (high level). On the other hand, FIG. 13B shows a case wherein the ink film 33 has wrinkles. When the detection roller 63 is lifted for a distance corresponding to the wrinkles, and this vertical movement of the detection roller 63 exceeds a predetermined degree, light from the LED is interrupted. Then, an output signal from the photodiode goes to logic level "0" (low level), thus providing an electrical signal representing presence of a wrinkle.

Figure 14:
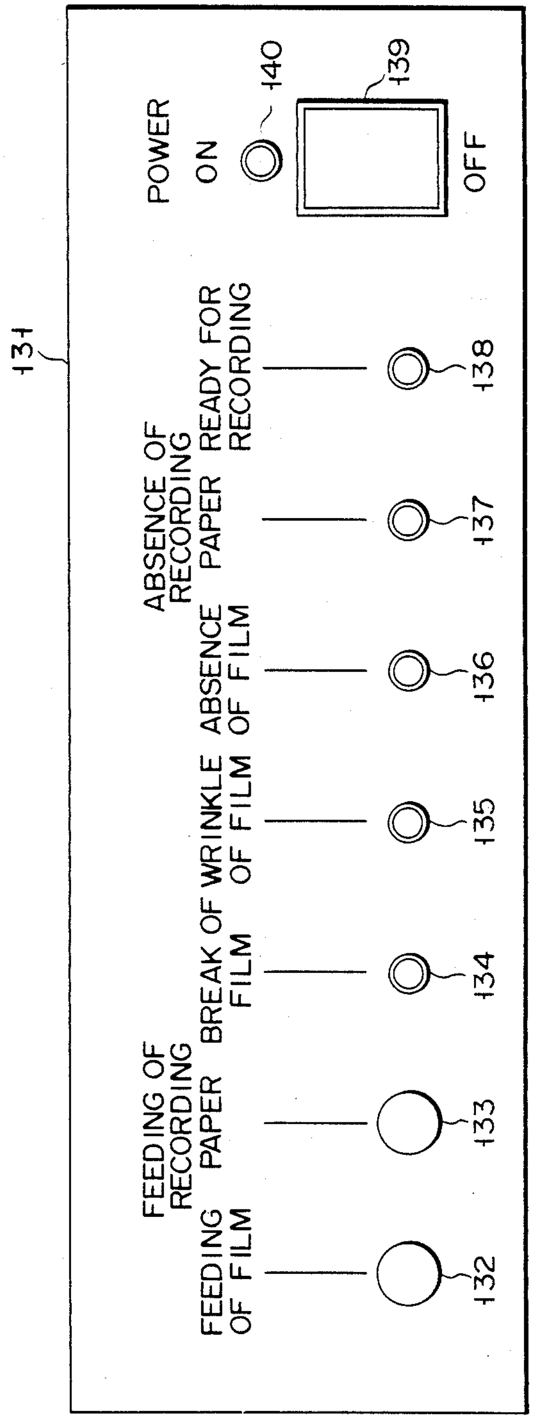
FIG. 14 is a representation showing the arrangement of a control panel of the apparatus shown in FIG. 11.

FIG. 14 is a view showing the arrangement of the control panel 131. A power source switch 139 is for turning on/off the apparatus as needed. When the power source switch 139 is on, a power source indication lamp 140 is lit. When a "ready for recording" indication lamp 138 is lit, the apparatus is ready for recording. In this state, the apparatus can record any time upon reception of image data from an external device. When an "absence of recording paper" indication lamp 137 or an "absence of film" indication lamp 136 is lit, it means the recording paper or the ink film is absent or about to be short in supply. When a "wrinkle of film" indication lamp 135 is lit, it means that the number of wrinkles is great and recording cannot be performed. If this indication lamp 135 is on, the ink film must be remounted, or a "feeding of film" switch 132 to be described later must be depressed so as to feed the portion of the ink film 33 with no wrinkle to the recording portion. When a "break of film" indication lamp 134 is lit, it means that the ink film 33 is torn down during feeding and recording cannot be performed. This means that the ink film must be remounted. When a "feeding of recording paper" switch 133 or the switch 132 is depressed, the urging force between the thermal head 20, the ink film 33 and the recording paper 22 is released, so that the recording paper 22 or the ink film 33 alone may be fed. With the incorporation of this mechanism, the presence or absence of abnormality of the feeding operation of the recording paper or the recording paper may be checked and maintenance is facilitated.

Figures 15A, 15B, 15C, 15D, 15E, 15F, 15G, 15H, 15I:
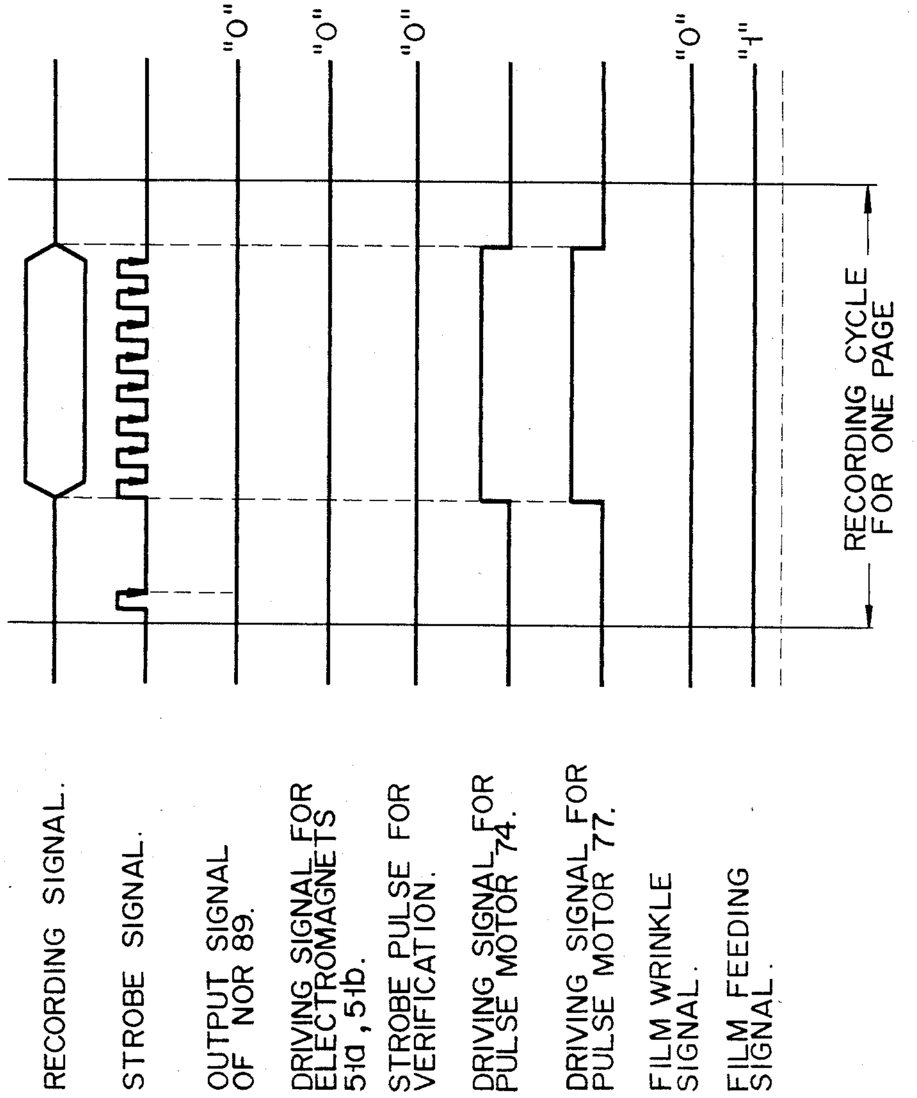
Figure 19:
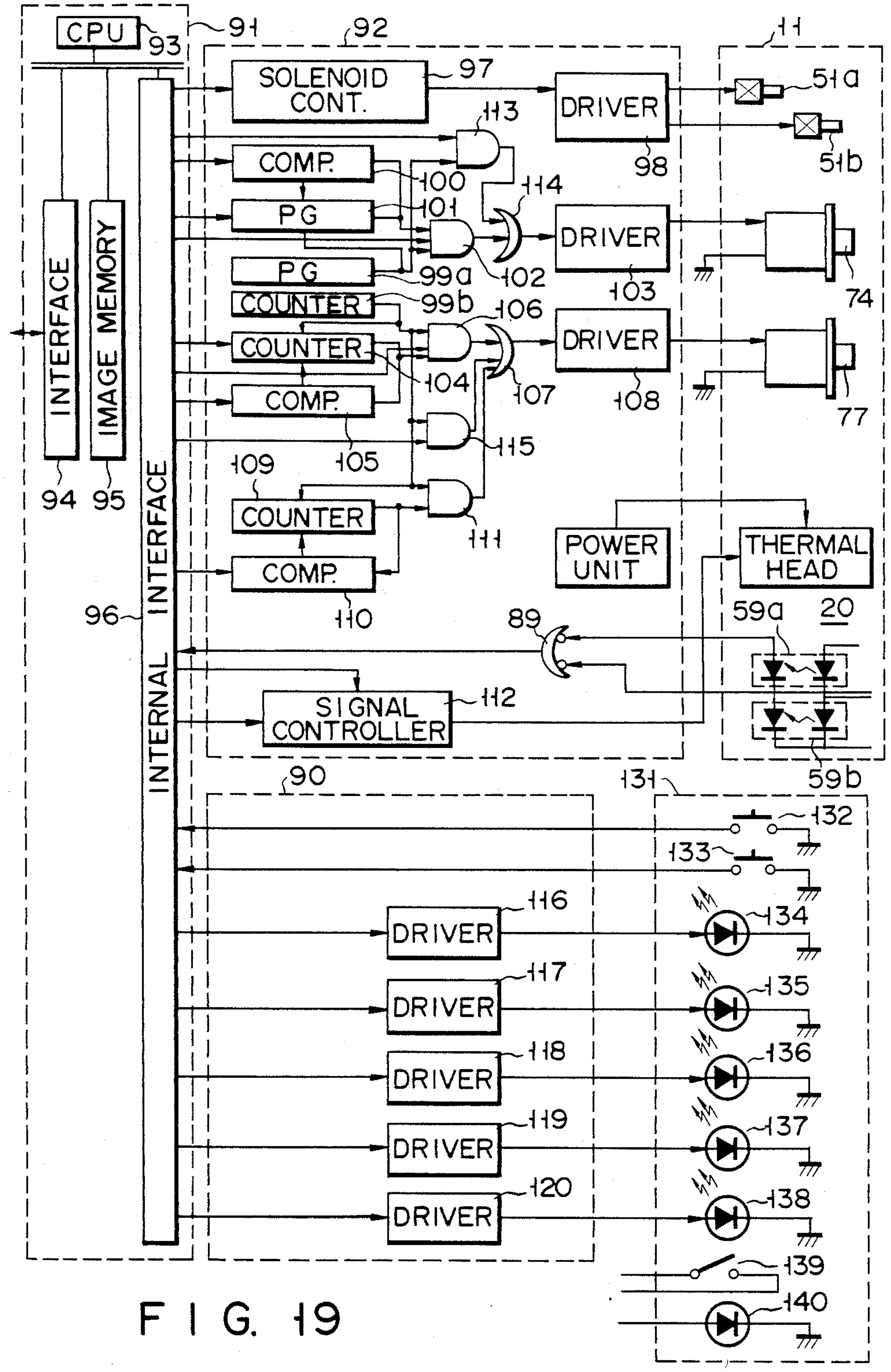
FIG. 19 is a block diagram of an electric control section of the apparatus shown in FIG. 15.

The recording mode of the apparatus of this embodiment will now be described with reference to the timing charts shown in FIGS. 15 through 18. In the state wherein the recording paper 22 and the ink film 33 are mounted and the indication lamp 138 is lit, a current is not supplied to the electromagnets 51*a* and 51*b*, and the thermal head 20 is urged against the platen roller 72. Then, recording may be initiated in accordance with the data from an external device. FIGS. 15A through 15I show an example of recording operation when formation of a wrinkle is not detected during the recording cycle for one page. Prior to recording, the CPU 93 generates a strobe signal for detecting the presence or absence of a wrinkle as shown in FIG. 15B. At this timing, the CPU 93 checks the logic level "0" or "1" of the output signal shown in FIG. 15C, that is, the output signal from the photointerruptor 59*a* and 59*b* after being passed through a NOR circuit 89 (FIG. 19). In FIG. 15C, the signal of logic level "1" indicates presence of a wrinkle. However, since the signal has logic level "0" in the figure, recording is initiated. As shown in FIG. 15F, a driving pulse is supplied to the pulse motor 74 to rotate the platen roller 72. Then, the recording paper 22 and the ink film 33 are urged against each other and are fed together at the same speed and in the same direction. At the same time, the recording signal as shown in FIG. 15A is supplied to the heating resistors 26 for recording. As shown in FIG. 15G, a driving pulse is supplied to the pulse motor 77 so as to take up the ink film on the takeup roll 34*b*. Meanwhile, as shown in FIG. 15B, the strobe signal is generated during the recording time so as to check formation of wrinkles during such time.

Figures 16A, 16B, 16C, 16D, 16E, 16F, 16G, 16H, 16I:
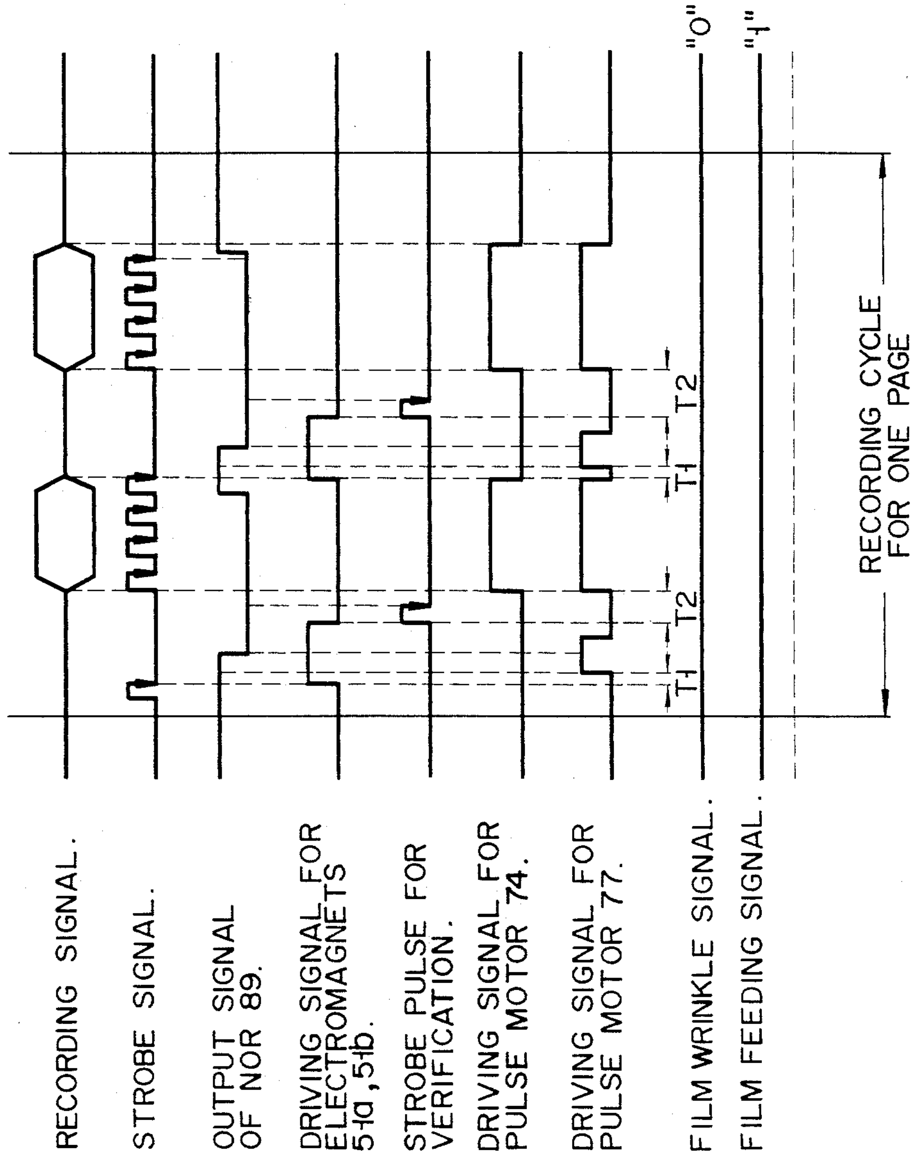
FIGS. 16A through 16I are timing charts for explaining the mode of operation when formation of a wrinkle is detected, the timing charts of FIGS. 16A to 16I showing the same signals, respectively, as those in FIGS. 15A to 15I.

FIGS. 16A through 16I show an example of the recording operation when a wrinkle is formed in the ink film 33. An example will be described wherein a wrinkle is formed toward the end of the previous recording cycle and a wrinkle is also formed in the current recording cycle. As in the case described above, prior to recording, a strobe signal as shown in FIG. 16B is generated. At the timing of generation of the strobe signal, the output from the NOR circuit 89 (FIG. 16C) is at logic level "1" indicating a wrinkle. In order to eliminate the wrinkle, the electromagnets 51*a* and 51*b* are energized for a certain time period as shown in FIG. 10D so as to release the urging force acting between the thermal head 20 and the platen roller 72. As a result, the urging state is released, so that the thermal head 20 and the platen roller 72 may independently move. After the time period T1 has elapsed from the energization of the electromagnets 51*a* and 51*b*, a driving pulse as shown in FIG. 16G is supplied to the pulse motor 77, and the ink film 33 is fed for a predetermined distance. Then, the thermal head 20 and the platen roller 72 are urged against each other. The CPU 93 generates a strobe signal for verification as shown in FIG. 16E so as to verify if the wrinkle has successfully been eliminated. At this timing, the signal shown in FIG. 6C is at logic level "0" (low level) which indicates complete elimination of the wrinkle. Recording may then be initiated. After the electromagnets 51*a* and 51*b* are deenergized, it takes about 50 msec before a sufficient urging force acts between the thermal head 20 and the platen roller 72. Thus, after a certain time period T2 longer than such time (50 msec) has elapsed from deenergization of the electromagnets 51*a* and 51*b*, a driving pulse is supplied to the pulse motor 74 so as to feed the recording paper and the ink film. Then, recording is performed in accordance with the recording signal as shown in FIG. 16A, and at the same time the pulse motor 77 is driven. As described above, the strobe signal as shown in FIG. 16B is generated. When a wrinkle is formed during recording, supply of the recording signal, the driving signal for the pulse motor 74, and the driving signal for the pulse motor 77 shown in FIGS. 16A, 16F and 16G is stopped. Then, the operation for eliminating the wrinkle prior to recording is repeated. The remaining recording process is performed thereafter. If a wrinkle is formed again, another operation for eliminating the wrinkle may be performed, thus preventing local transfer failure.

FIGS. 17A through 17I show a case wherein a wrinkle is formed during recording but is not eliminated by one wrinkle eliminating operation, so that another wrinkle eliminating operation must be performed. In this case, it is effective to assure a long time for releasing the urging force between the thermal head 20 and the platen roller 72 and to assure a long feeding time of the ink film 33 in the first and second wrinkle eliminating operations. The respective signals hold the relationship as in the case of FIGS. 16A through 16I.

FIGS. 18A through 18I show a case wherein the wrinkles are not completely eliminated upon two wrinkle eliminating operations. In this case, some abnormality must be present in the feeding operation of the ink film 33. Thus, in order to signal this to the operator, the "wrinkle of film" indication lamp 135 is lit by the signal as shown in FIG. 18H. Then, the operator depresses the switch 132 for feeding the ink film 33 for a predetermined distance. If the wrinkles are eliminated by this operation, the remaining recording is performed for one page.

In order to eliminate the wrinkles, a tension may be applied to the ink film 33 utilizing springs 128L and 128R assembled in the shaft in place of the pulse motor 77.

FIG. 19 is a block diagram of an electric control section 12 of the second embodiment. The electric control section comprises an input/output control section 91, a mechanical control section 92, a control panel 131, and a driver section 90. The electric control section of this embodiment differs from that of the first embodiment in that an AND circuit 115 is added and in the following respects. When the "feeding of recording paper" switch 133 on the control panel 131 is depressed, a signal "2" is supplied to an AND circuit 113 from the CPU 93 through an internal interface 96. A pulse signal from a pulse generator 99a is supplied to the pulse motor 74 through an OR circuit 114 and a driver 103 for feeding recording paper 22. At the same time, a signal of logic level "1" is produced from a solenoid controller 97 so as to drive the electromagnets 51a and 51b through a driver 98 and to release the urging force acting between the thermal head 20 and the platen roller 72. As in the case of the AND circuit 113, when the "feeding of film" switch 132 on the control panel 131 is depressed, the AND circuit 115 drives the pulse motor 77 so as to feed the ink film 33 alone. In this case, the electromagnets 51a and 51b are energized, and the urging force acting between the thermal head 20 and the platen roller 72 is released. When one of photointerruptors 59a and 59b generates a signal of logic level "0", the NOR circuit 89 supplies a signal of logic level "1" to the internal interface 96. Drivers 110, 111, 118, 119, and 120 in the driver section 90 drive the lamps 134, 135, 136, 137 and 138, respectively.

What is claimed is:

1. A thermal transfer recording apparatus comprising:

(a) an ink carrier including an ink layer capable of exhibiting a predetermined characteristic upon being heated;

(b) a thermal head in which a plurality of heating elements are arranged which are adapted to be urged against a surface of said ink carrier on which said ink layer is not coated;

(c) first feeding means for, in order to transfer said ink layer onto a recording medium by heat from said heating elements of said thermal head, feeding said ink carrier and said recording medium in the same direction by urging said heating elements, said ink carrier and said recording medium upon each other;

(d) means for releasing urging force acting among said heating elements, said ink carrier and said recording medium;

(e) second feeding means for feeding said ink carrier independently of said recording medium; and (f) control means, connected to said releasing means and said second feeding means, for controlling said second feeding means so that the urging force acting among said heating elements, said ink carrier and said recording medium is released so as to keep said ink carrier taut, thereby feeding said ink carrier independently of said recording medium.

2. An apparatus according to claim 1, wherein an operation of said control means is performed at least once prior to recording for one page.

3. An apparatus according to claim 1, wherein an operation of said control means is performed at least once after recording for one page.

4. An apparatus according to claim 1, wherein an operation of said control means is performed at least once during recording for one page.

5. An apparatus according to claim 1, further comprising switching means, operable by an operator, for controlling said second feeding means for feeding said ink carrier for a predetermined distance.

6. An apparatus according to claim 1, further comprising wrinkle detecting means for detecting a wrinkle of said ink carrier, and indicating means for indicating formation of the wrinkle detected by said wrinkle detecting means.

7. An apparatus according to claim 1, wherein said control means drives said releasing means so as to release the urging force acting between said heating elements, said ink carrier and said recording medium, and thereafter drives said first feeding means for feeding said recording medium alone.

8. An apparatus according to claim 1, further comprising switching means, operable by an operator, for controlling said first feeding means for feeding said ink carrier for a predetermined distance.

* * * * *